United States Patent

Huang

Patent Number: 6,143,340
Date of Patent: Nov. 7, 2000

[54] MANUFACTURING METHOD FOR ENCOMMIAE ULMOIDE YOUNG LEAF TEA

[76] Inventor: Shui-Tsuan Huang, 12F, No. 308, Sec. 6, Min-Chyuan E. Rd., Taipei, Taiwan

[21] Appl. No.: 09/261,389

[22] Filed: Mar. 3, 1999

[51] Int. Cl.⁷ .............................. A23B 4/03; A23F 3/00
[52] U.S. Cl. ......................... 426/466; 426/469; 426/597
[58] Field of Search .................................. 426/597, 466, 426/469

[56] References Cited

PUBLICATIONS

Database Abstract. Derwent–Acc–No: 1977–126392 for JP09009929A. Inventor: Ono et al, Jan. 14, 1997.

Database Abstract. Derwent–Acc–No: 1985–245710 for JP6016073A. Patent Assignee: Nishi Nippon, Jan. 14, 1997.

*Primary Examiner*—Anthony J. Weier
*Attorney, Agent, or Firm*—Varndell & Varndell, PLLC

[57] ABSTRACT

A manufacturing method for encommiae ulmoide young leaf tea including the procedures of selectively extracting encommiae ulmoide young leaf rich of nutrition, removing the green, baking and frying the young leaf and high temperature drying the young leaf for removing the bitter and astringent taste. The encommiae ulmoide tea contains the components of calcium, phosphorus, iron, natrium, potassium, etc. and can be brewed to provide an exellent taste.

4 Claims, 1 Drawing Sheet

| components contained in per 100 gram encommiae ulmoide tea |
|---|
| calcium . . . . . . . . . . . . . . . 1300 mg |
| phosphorus . . . . . . . . . . . . . 250 mg |
| iron . . . . . . . . . . . . . . . . . . . . 30 mg |
| natrium . . . . . . . . . . . . . . . . 1.3 mg |
| potassium . . . . . . . . . . . . 1500 mg |

MANUFACTURING METHOD FOR ENCOMMIAE ULMOIDE YOUNG LEAF TEA

BACKGROUND OF THE INVENTION

The present invention relates to a manufacturing method for encommiae ulmoide young leaf tea, and more particularly to a manufacturing method for encommiae ulmoide young leaf tea, which is able to remove the bitter and astringent taste and achieve an exellent taste and the manufactured encommiae ulmoide tea contains proper amount of calcium, phosphorus, iron, natrium, potassium, etc.

More and more manufacturing methods for healthy drinks have been developed, such as the existing guava tea manufacturing method and bitter-melon tea manufacturing method. In these methods, the guava leaves or bitter-melon with nutritions are manufactured into guava leaf tea or bitter-melon tea for brewing. However, there is still no better method for manufacturing encommiae ulmoide tea from encommiae ulmoide young leaf tea with the high nutrition contained therein maintained. It is known that the encommiae ulmoide pertains to leaf-falling plants, containing numerous kinds of mineral and vitamins and able to expedite human metabolism and slow down oldening. The encommiae ulmoide skin has been used as a revitalizer in herbal medicine long -since. In recent research, it is found that the encommiae ulmoide leaf contains the same components as the encommiae ulmoide skin and has high nutrition. In the existing method for manufacturing encommiae ulmoide tea, after the encommiae ulmoide leaves are dried and chopped, the encommiae ulmoide leaves are packed into a tea bag. The encommiae ulmoide leaves adopted in the conventional manufacturing method are generally old leaves and encommiae ulmoide skin by reason that the extraction period of the old leaves is relatively long through four seasons of a year. However, in such leaves, most of the nutritions have been lost and a healthy effect can be hardly achieved. Moreover, the encommiae ulmoide tea made by the conventional manufacturing method will release specific bitter and astringent taste when brewed. Such taste is poor and make it hard to drink the encommiae ulmoide tea.

SUMMARY OF THE INVENTION

It is a primary object of the present invention to provide a manufacturing method for encommiae ulmoide young leaf tea with high nutrition and can be conveniently drunk by brewing. The manufacturing method is able to remove the bitter and astringent taste of the encommiae ulmoide tea and improve the taste of the Encommiae ulmoide tea.

According to the above object, the manufacturing method for encommiae ulmoide young leaf tea of the present invention includes the procedures of: selectively extracting encommiae ulmoide young leaf having grown for two to four weeks; removing the green; baking and frying the young leaves; and drying the leaves at high temperature. By means of selecting the young leaves of encommiae ulmoide, the components of calcium, phosphorus, iron, natrium, potassium etc. are prevented from losing so as to achieve an encommiae ulmoide tea with high nutrition. In the green-removing procedure, the perfume of the encommiae ulmoide tea is enhanced. In the high temperature drying procedure, the bitter liquid is removed so as to improve the taste of the encommiae ulmoide tea.

The present invention can be best understood through the following description and accompanying drawings, wherein:

DETAILED DESCRIPTION OF THE PREFERRED EMBODIMENT

Figures 1, 2:
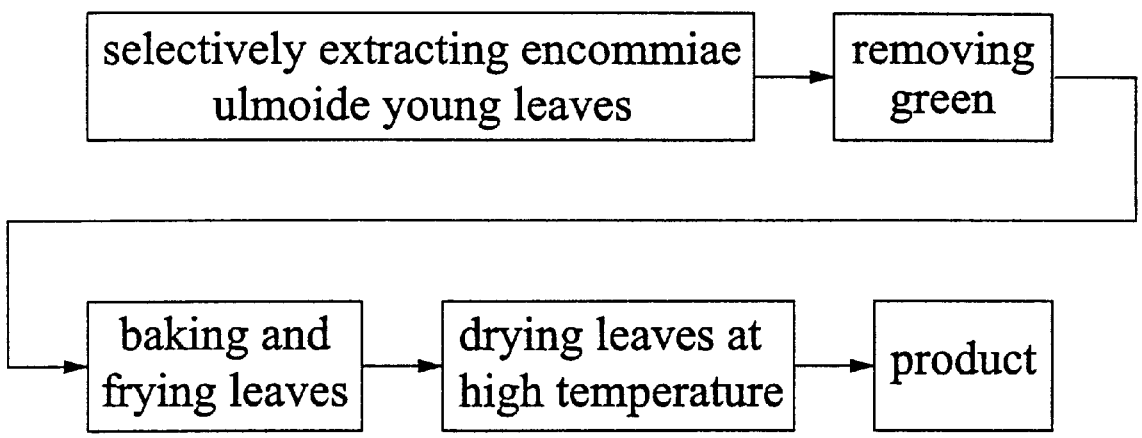
FIG. 1 is a manufacturing flow chart of the present invention.
FIG. 2 is a nutrition table of the encommiae ulmoide tea of the present invention.

Please refer to FIG. 1. The manufacturing method for encommiae ulmoide young leaf tea of the present invention includes the procedures of selectively extracting encommiae ulmoide young leaf, removing the green, baking and frying young leaf and high temperature drying the leaf. In the procedure of extracting the encommiae ulmoide young leaf, the extracted encommiae ulmoide young leaves are those having grown for two to four weeks. In the high temperature drying procedure, the leaves are placed under 180° C. to be baked for about 10 to 12 minutes.

The material of the present invention is encommiae ulmoide young leaf. This is because that encommiae ulmoide young leaf contains nutrition much higher than that contained in encommiae ulmoide skin or encommiae ulmoide old leaf. (Encommiae ulmoide young leaf contains nutrition ten times more than that contained in encommiae ulmoide skin and 100 times more than that contained in encommiae ulmoide old leaf) Therefore, encommiae ulmoide young leaf can be manufactured into a beverage with higher nutrition as shown in FIG. 2. The encommiae ulmoide pertains to leaf-falling plants so that the growing life of the encommiae ulmoide leaf is very short. In general, the encommiae ulmoide leaf having grown for two to four weeks contains highest nutrition. After growing for over four weeks, the encommiae ulmoide leaf will gradually decay to lose the nutrition. Therefore, in order to manufacture encommiae ulmoide tea with high nutrition, the encommiae ulmoide leaf must be extracted within two to four weeks so as to maintain the components of calcium, phosphorus, iron, natrium, potassium, etc.

In the green-removing procedure, the odor of the leaves is removed to disclose the perfume of the encommiae ulmoide tea. In general, the green-removing procedure is performed at high temperature. The green-removing time should not be too long so as to avoid charring of the leaves. In addition, by means of properly controlling the green-removing time, the components of calcium, phosphorus, iron, natrium (sodium), potassium, etc. contained in the encommiae ulmoide leaves can be maintained.

In the young leaf baking and frying procedure, the encommiae ulmoide leaves go through a bactericidal procedure so as to reduce the bitter and astringent particles contained in the encommiae ulmoide leaf and also maintain the perfume dissipated from the encommiae ulmoide leaf having going through the green-removing procedure.

In the high temperature drying procedure, the bitter liquid extracted from the encommiae ulmoide leaf is removed so as to eliminate the bitter and astringent taste of the tea and improve the taste thereof. Only high temperature can totally remove the bitter liquid without attaching to the encommiae ulmoide leaf. In general, the leaves are placed under 150° C. high temperature to be baked for about 10 to 12 minutes.

In addition, during the baking and frying procedure, in the case of too small leaves, charring may take place. However, in the case of too large leaves, the bactericidal procedure may be incomplete. Therefore, both too small and too large leaves may lead to bitter taste. Generally, when extracting the encommiae ulmoide leaf, suitable leaves are selected. In general, the leaves of 5–9 cm length and 2–4 width are optimal.

It should be noted that the above description and accompanying drawings are only used to illustrate one embodiment of the present invention, not intended to limit the scope thereof. Any modification of the embodiment should fall within the scope of the present invention.

What is claimed is:

1. A manufacturing method for encommiae ulmoide young leaf tea comprising the steps of:
   (1) selectively extracting encommiae ulmoide young leaves having grown for two to four weeks;
   (2) removing green color of the young leaves from step (1) at a high temperature, while controlling the high temperature to retain components selected from the group consisting of calcium, phosphorus, iron, natrium and potassium in the young leaves;
   (3) baking and frying the young leaves from step (2); and
   (4) drying the young leaves from step (3) at high temperature.

2. A manufacturing method for encommiae ulmoide young leaf tea as claimed in claim 1, wherein in step (1), leaves of 5–9 cm in length and 2–4 cm in width are extracted.

3. A manufacturing method for encommiae ulmoide young leaf tea as claimed in claim 1, wherein in step (4) the young leaves are baked at 150° C. for about 10 to 12 minutes.

4. A manufacturing method for encommiae ulmoide young leaf tea as claimed in claim 1, wherein 100 grams of tea made from the young leaves resulting from step (4) contains about 1300 mg calcium, 250 mg phosphorus, 30 mg iron, 1.3 mg natrium, and 1550 mg potassium.

* * * * *